United States Patent
Sproat et al.

(10) Patent No.: US 9,852,123 B1
(45) Date of Patent: Dec. 26, 2017

(54) SEMIOTIC CLASS NORMALIZATION

(71) Applicant: Google Inc., Mountain View, CA (US)

(72) Inventors: Richard Sproat, Hamilton, NJ (US); Ke Wu, Jersey City, NJ (US); Kyle Gorman, Brooklyn, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/165,328

(22) Filed: May 26, 2016

(51) Int. Cl.
*G06F 17/27* (2006.01)
*G06F 17/28* (2006.01)
*G06F 17/22* (2006.01)

(52) U.S. Cl.
CPC ........ *G06F 17/274* (2013.01); *G06F 17/2264* (2013.01); *G06F 17/277* (2013.01); *G06F 17/2881* (2013.01)

(58) Field of Classification Search
CPC ............. G06F 17/2881; G06F 17/2755; G06F 17/277; G06F 17/2775; G06F 17/2785; G06F 17/2872; G06F 13/08; G06F 2013/083
See application file for complete search history.

(56) References Cited

U.S. PATENT DOCUMENTS

| | | | | |
|---|---|---|---|---|
| 4,805,100 A * | 2/1989 | Ozeki | ................. | G06F 17/2863 704/1 |
| 5,122,951 A * | 6/1992 | Kamiya | ................. | G06F 17/274 704/9 |
| 5,367,609 A * | 11/1994 | Hopper | ..................... | G06F 3/16 379/214.01 |
| 5,634,084 A * | 5/1997 | Malsheen | ............. | G06F 17/273 704/260 |
| 6,275,817 B1 * | 8/2001 | Reed | .................... | G06F 17/2755 706/45 |
| 6,292,773 B1 * | 9/2001 | Bernardes | ............. | G06F 9/4448 379/88.05 |
| 6,513,002 B1 * | 1/2003 | Gillam | .................. | G06F 17/273 704/257 |
| 9,262,407 B1 * | 2/2016 | Ermann | ................ | G06F 9/4448 |

(Continued)

OTHER PUBLICATIONS

Beaufort et al., "A hybrid rule/model-based finite-state framework for normalizing SMS messages," In ACL, pp. 770-779, Jul. 2010.

(Continued)

*Primary Examiner* — Eric Yen
(74) *Attorney, Agent, or Firm* — Fish & Richardson P.C.

(57) ABSTRACT

A language processing system for text normalization of an input string of a semiotic class. In an aspect, a method includes receiving an input string; accessing, for a semiotic class of non-standard words, a language universal covering grammar for a plurality of languages that generates, for each language of the plurality of languages, one or more sequences of word-level components for each instance of the semiotic class in the language; for each of the plurality of languages, accessing a lexical map specific to the language and that maps each sequence of word-level components for each instance of the semiotic class in the language verbalizations in the language; generating, from the language universal grammar and the lexical maps, a lattice of possible verbalizations of the input string; and selecting one of the possible verbalizations as a selected verbalization for the input string.

13 Claims, 3 Drawing Sheets

(56) References Cited

U.S. PATENT DOCUMENTS

| | | | | |
|---|---|---|---|---|
| 2002/0111786 | A1* | 8/2002 | Sugeno | G06F 17/277 704/1 |
| 2004/0138891 | A1* | 7/2004 | Vora | G06F 9/4448 704/270.1 |
| 2004/0249667 | A1* | 12/2004 | Oon | G06F 17/2785 705/2 |
| 2010/0217581 | A1* | 8/2010 | Hong | G06F 17/2223 704/3 |
| 2013/0185050 | A1* | 7/2013 | Bird | G06F 17/2881 704/2 |
| 2013/0283156 | A1* | 10/2013 | Al Badrashiny | G06F 17/273 715/257 |
| 2014/0288915 | A1* | 9/2014 | Madnani | G06F 17/289 704/2 |
| 2015/0242386 | A1* | 8/2015 | Moreno Mengibar | G06F 17/273 704/235 |

OTHER PUBLICATIONS

Pennell and Liu, "Toward text message normalization: Modeling abbreviation generation," In ICASSP, pp. 5364-5367, 2011.

Sproat et al., "Normalization of non-standard words," Computer Speech and Language, 15(3):287-333, 2001.

Sproat, "Lightly supervised learning of text normalization: Russian number names," In IEEE Workshop on Speech and Language Technology, pp. 436-441, Dec. 2010.

Sproat, "Multilingual text analysis for text-to-speech synthesis," Natural Language Engineering, 2(4):369-380, 1996.

Yang and Eisenstein, "A log-linear model for unsupervised text normalization," In EMNLP, pp. 61-72, 2013.

\* cited by examiner

SEMIOTIC CLASS NORMALIZATION

BACKGROUND

This specification relates to speech and language recognition and understanding systems.

Speech recognizers and synthesizers require systems to convert non-standard words, such as numbers (e.g., 97), dates (e.g., 3/23), times (e.g., 8:50 pm), currency expressions (e.g., $1.50), measure phrases (e.g., 10 kg), abbreviations (e.g., St.) and the like to pronounceable versions (ninety-seven, March twenty-third, etc.). Such a pronounceable version expressed in terms of ordinary words is referred to as a "verbalization."

For many languages, the non-standard words may be grouped into classes, such as cardinal numbers, dates, times, and so on. Each such class is referred to as a semiotic class, e.g., the semiotic classes of cardinal numbers, dates, times, etc.

The process of converting instances of semiotic classes to verbalizations is referred to as text normalization. This is largely accomplished by hand-built grammars written by native speaker linguists, and require many man-hours for each language. The process of training or writing a selector for selecting a verbalization is also labor intensive and requires a large amount of training data, which, in turn, has a commensurate computer resource requirement.

SUMMARY

In general, one innovative aspect of the subject matter described in this specification can be embodied in methods that include the actions of receiving an input string; accessing, for a semiotic class of non-standard words, a language universal covering grammar for a plurality of languages that generates, for each language of the plurality of languages, one or more sequences of word-level components for each instance of the semiotic class in the language; for each of the plurality of languages, accessing a lexical map specific to the language and that maps each sequence of word-level components for each instance of the semiotic class in the language verbalizations in the language; generating, from the language universal grammar and the lexical maps, a lattice of possible verbalizations of the input string; and selecting one of the possible verbalizations as a selected verbalization for the input string. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The process of inducing grammars and selecting a most appropriate verbalization for an input string can be accomplished with minimal knowledge about the languages that are served and a relatively small amount of parallel data when compared to existing systems. This yields a technological improvement in the technology area of language processing by reducing development time and processing resources required for building a semiotic class text normalization system. The process also reduces the amount of trainers'/administrators' linguistic expertise required in that all that is needed is a linguistically aware speaker of a language, rather than someone who has experience at grammar development.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
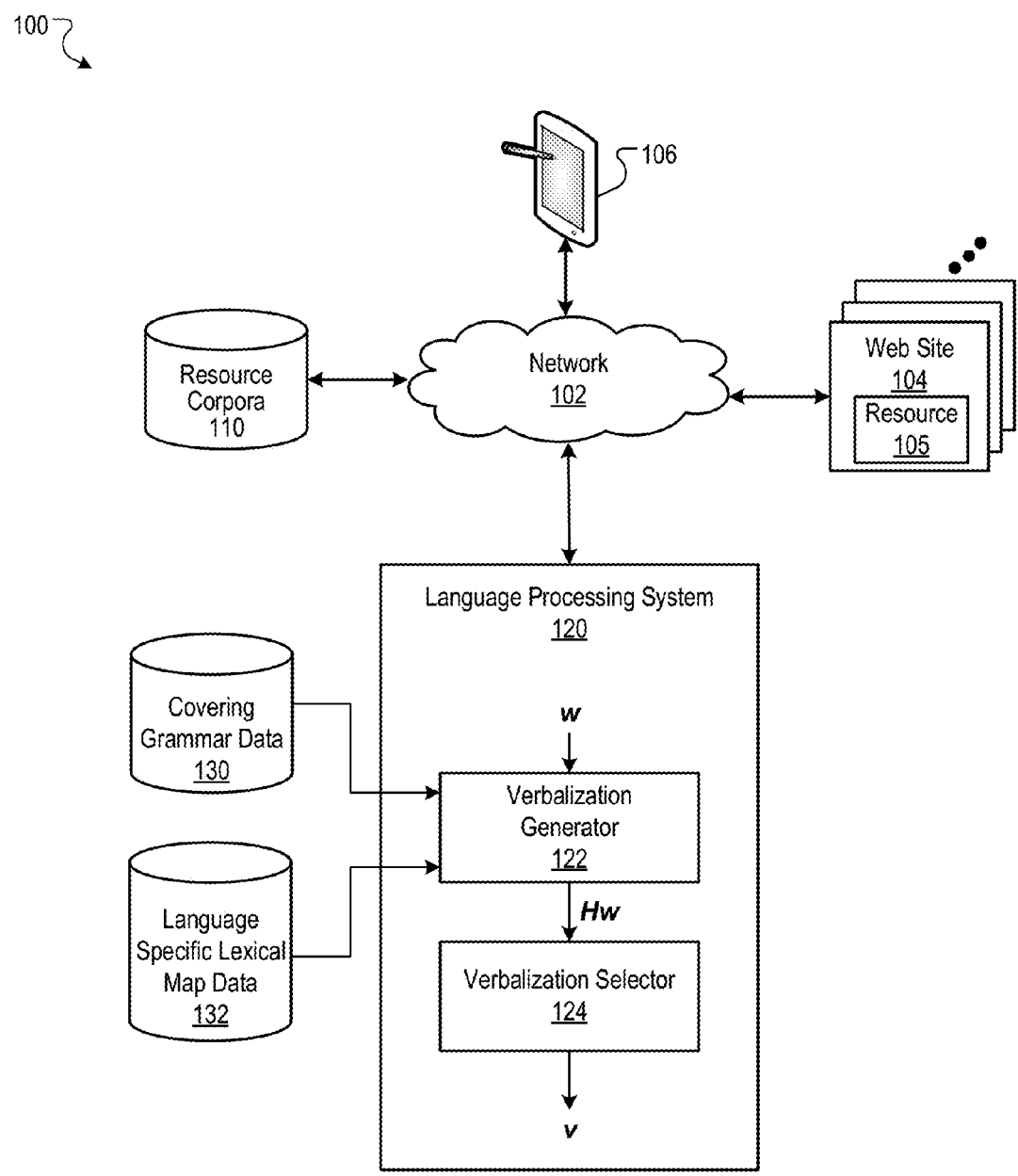
FIG. 1 is a block diagram of an environment in which an input string of a semiotic class is processed to determine a verbalization.

FIG. 1 is a block diagram of an environment 100 in which an input string of a semiotic class is processed to determine a verbalization. A computer network 102, such as a local area network (LAN), wide area network (WAN), the Internet, or a combination thereof, provides for data communication between electronic devices and systems. Examples of such electronic device and systems include web sites 104 and user devices 106.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104. A resource 105 is any data that can be provided by the website 104 over the network 102 and that is associated with a resource address.

Some or all of the resources 105 may be indexed in resource corpora 110. The resource corpora 110 may be created and maintained by a search system (not shown), or by some other system.

A user device 106 is an electronic device that is under the control of a user and is capable of requesting and receiving resources over the network 102, establishing communication channels, e.g., voice communications, with other user devices 106, and also capable of performing other actions. Example user devices 106 include personal computers, mobile communication devices, and other devices that can send and receive data over the network 102.

The resource corpora 110 and resources 105 may be accessed by a language processing system 120. The language processing system 120 may perform a variety of functions and services, such as text-to-speech recognition, translations, and the like. One of the capabilities of language processing system 120 is text normalization for input strings of semiotic classes.

In the example implementation shown in FIG. 1, the language processing system 120 includes a verbalization generator 122 and a verbalization selector 124. At a high level, the verbalization generator 122 receives an input string w and accesses a covering grammar stored in the covering grammar data 130 and language specific lexical maps stored in the language specific lexical map data 132. The verbalization generator 122 generates a collection of possible verbalizations Hw for the input string w, and, using a verbalization selector 124, selects an appropriate verbalization v for the input string w.

Figure 2:
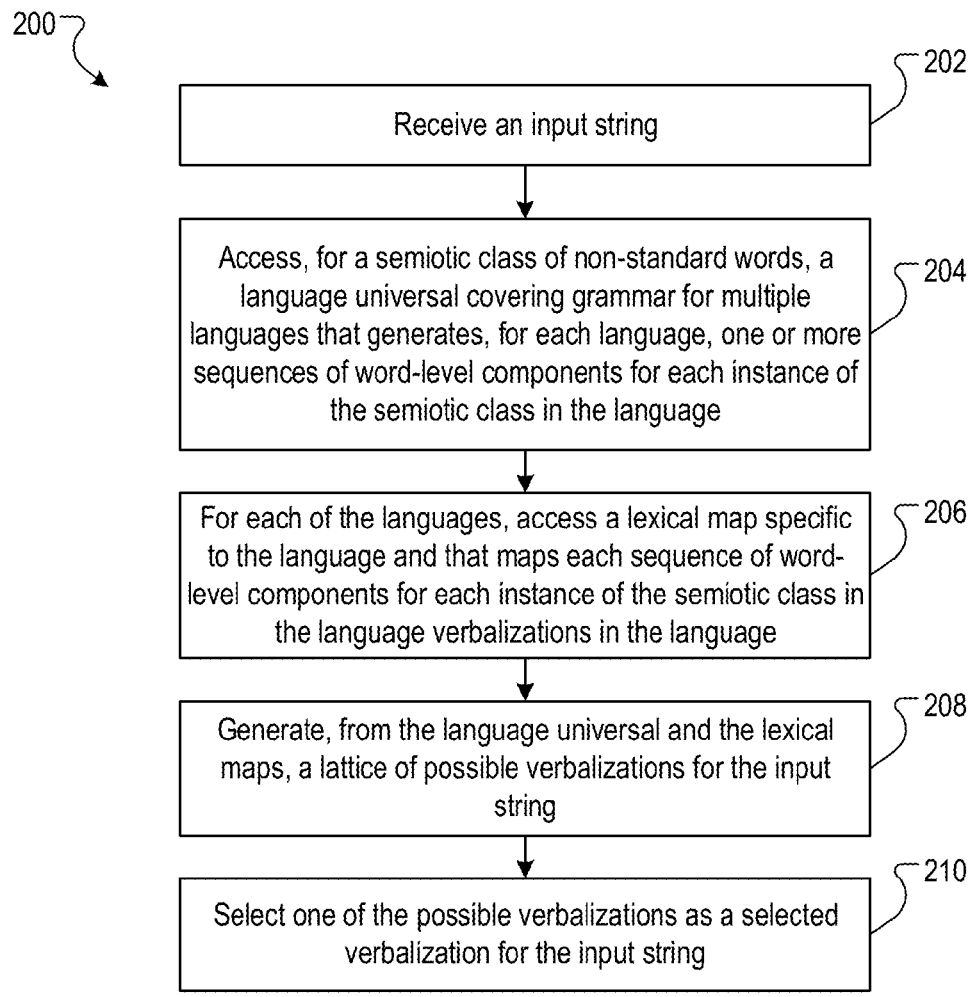
FIG. 2 is a flow diagram of an example process for determining a verbalization from an input string of a semiotic class.

The language processing system 120 may be implemented in one or more computers in data communication with each other. Operation of the language processing system 120 is described in more detail with reference to FIG. 2, which is a flow diagram of an example process 200 for determining a verbalization from an input string of a semiotic class.

The process 200 receives an input string (202). For example, the verbalization generator 122 may receive an input string w. The string may be processed by many language processes in parallel, such as name recognition, entity identification, command processing, and the like. Here the verbalization generator 122 and the verbalization 124 perform text normalization for semiotic classes. Thus, assume that the input string w includes text belonging to a semiotic class.

The process 200 accesses, for a semiotic class of non-standard words, a language universal covering grammar for a plurality of languages that generates, for each language of the plurality of languages, one or more sequences of word-level components for each instance of the semiotic class in the language (204). The language-universal covering grammar G generates possible ways that a language might verbalize a semiotic class for multiple languages. For example, the language universal covering grammar G for the cardinal number semiotic class may generate, for the input string 97, the following word level components, where each digit string such as "90" or "80" is understood to stand for a word or words of the target language:

90 7 (English)
7 90 (German)
80 10 7 (Georgian)
4 20 10 7 (French)
. . .

The language-universal covering grammar G is designed to cover the reasonable (e.g., most common or most likely) ways in which a given language might verbalize a given expression. For example, the covering grammar G takes into account that a language might express 97 as a combination of a word for "90" followed by a word for "7," as in English; or a word for "80" followed by a word for "10" followed by a word for "7" as in Georgian, etc.

For each semiotic class, the covering grammar G incorporates rules that will map the input string to the word-level components in the languages. For example, for the example cardinal number semiotic class described above, the covering grammar G may include factorization rules that are consistent with the spoken form of the cardinal number in each language. Thus, for a given input number, the grammar G outputs a sequence of two or more second numbers that are a language specific factorization of the first number. For example, in English, 97000 is factored as 90 7 1000. However, in Standard French, for example, there is no simplex number name for '90'; instead this is realized as quatre-vingt-dix "four twenty ten", and thus 97000 (quatre-vingt-dix-sept mille) is factored as 4 20 10 7 1000. By way of another example, for the semiotic class of weight measurements, the non-standard word "kg" in English may be mapped to "kilogram" and "kilos."

The process 200, for each of the languages, accesses a lexical map L specific to the language and that maps each sequence of word-level components for each instance of the semiotic class in the language verbalizations in the language (204). Each language specific lexical map L generates possible pronunciations of the word-level components of non-standard words. For example, in English, the a lexical map L for cardinal numbers maps 10 to ten, 20 to twenty, and so on. Likewise, for the semiotic class of currency, the non-standard word $ is mapped to dollar and dollars, etc.

The process 200 generates, from the language universal grammar and the lexical maps, a lattice of possible verbalizations v of the input string (208). For example, for the input string 97, the verbalization generator 122, using the covering grammar G, generates 90 7 for the English word level components of the semiotic class of cardinal numbers, and 4 20 10 7 for the standard French word level components. Thereafter, the verbalization generator 122, using the language specific lexical maps L, generates "ninety seven" for English and "quatre vingt dix sept" for French.

In implementations for which G and L are both finite state transducers, then the verbalization generator 122 generates $Hw=\pi_o(w \circ G \circ L)$, where Hw is a lattice of all possible verbalizations for some non-standard input string w, and $\pi_o$ is an output projection that is a finite automaton that accepts a string y if and only if there exists a string x such that $Hw(x) \rightarrow y$.

The process 200 selects one of the possible verbalizations as a selected verbalization for the input string (210). A variety of appropriate selection processes can be used. For example, in some implementations, the verbalization selector 124 may have access to grammatical rulesets for each language. Each grammatical ruleset is then applied to each possible verbalization. Each possible verbalization that does not comply with a ruleset may be filtered from being selected as a verbalization. For example, in English, for the class of cardinal numbers, the possible verbalization "four twenty ten seven" would not comply with a grammatical rule set for verbalization of the input string "97." However, for the grammatical rule set of standard French, the possible verbalization "quatre vingt dix sept" would comply with a grammatical rule set for the verbalization of "97."

Another selection process is a scoring process function that generates a verbalization score for each possible verbalization. The possible verbalization with a "best" verbalization score is then selected as the selected verbalization for the input string. For example, the verbalization selector 124 may be implemented as a weighted finite state acceptor that receives each possible verbalization and generates a score for only each accepted possible verbalization. The verbalization selector 124 is encoded with a language model specific to the semiotic class. The verbalization v that is selected for the input string w is the one with a highest verbalization score.

Another scoring model that may be implemented in the verbalization selector 124 may be based on a supervised sequence model, in which case v is the highest-scoring path through Hw. In that case, parallel data of sequences of non-standard words and the corresponding verbalizations in the target language are used to train the verbalization selector 124. In one implementation, the scoring function of the verbalization selector 124 is a Maximum Entity (MaxEnt) ranker that is trained using parallel data. For example, for the semiotic class of cardinal numbers, the verbalization selector is trained using written data of text that includes numbers written as digit sequences and spoken data in the form of text that contains the words that a speaker would actually utter when reading the digit sequences.

Figure 3:
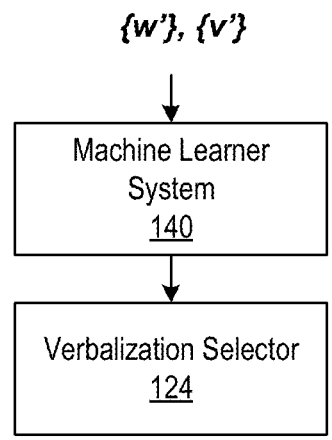
FIG. 3 is a block diagram of a training system for the verbalization selector.
Figure 4:
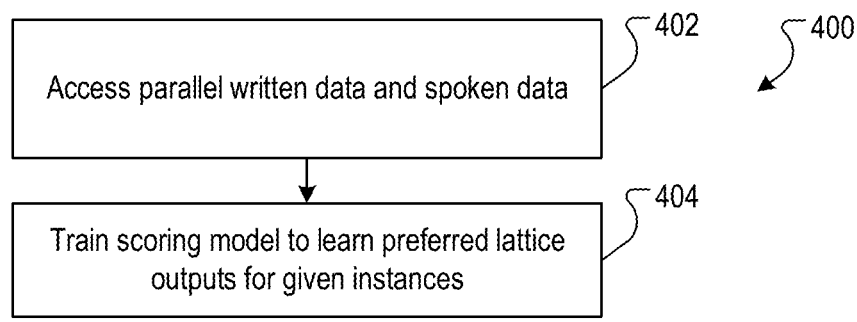
FIG. 4 is flow diagram of an example process training the verbalization selector.

This is illustrated in FIG. 3, which is a block diagram of a training system for the verbalization selector 124. The training process is illustrated by the flow diagram of the process 400 of FIG. 4.

The process 400 accesses parallel written data and spoken data (402). For example, the machine learner system 140 process receives the written data and spoken data {w'}, {v'}. The process 400 then trains the scoring model to learn preferred lattice outputs for given instances of the semiotic class in each language (404).

In implementations in which finite state transducers are used, the scoring model can be trained without any true parallel data. This is due to the property that finite state transducers are invertible: a transducer that maps from digit sequences to number names can be inverted, resulting in a transducer that maps number names to digit sequences. Utilizing this property, a system can map from spoken to written expression form rather than from written expression form to spoken form, e.g., the input "twenty-three" produces the output "23." Accordingly, spoken data can be used to produce a set of potential written forms. The scoring model is then trained with the synthetic training data as describe above.

More generally, the system may be used to consider implicitly all possible written forms and the spoken forms that might be generated from them. Consider a verbalization transducer V and its inverse $V^{-1}$. The system can produce a "round trip" set of verbalizations such that if the original spoken form was y, then the set of possible verbalizations is given as $\pi_o[/y \circ V^{-1} \circ V]$.

These potential other verbalizations are then be used to train a classifier that will prefer the true verbalization over the other potential verbalizations.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
    a data processing apparatus; and
    a non-transitory computer readable storage medium in data communication with the data processing apparatus storing instructions executable by the data processing apparatus and that upon such execution causes the data processing apparatus to perform operations comprising:
    receiving an input string;
    accessing, for a semiotic class of non-standard words, a language universal covering grammar for a plurality of languages that generates, for each language of the plurality of languages, one or more sequences of word-level components for each instance of a member of the semiotic class in the language;
    for each of the plurality of languages, accessing a lexical map specific to the language and that maps each sequence of word-level components for each instance of a member of the semiotic class in the language to verbalizations in the language;
    generating, from the language universal grammar and the lexical maps, a lattice of possible verbalizations of the input string; and
    selecting one of the possible verbalizations as a selected verbalization for the input string.

2. The system of claim 1, wherein selecting one of the possible verbalizations as a selected verbalization for the input string comprises:
    generating, for each possible verbalization of the input string, a verbalization score according to a scoring function; and
    selecting one of the possible verbalization as the selected verbalization for the input string based on the respective verbalization scores.

3. The system of claim 2, wherein the scoring function comprises, for each language, a weighted finite state acceptor that receives each possible verbalization and generates a score for only each possible verbalization accepted by the weighted finite state acceptor.

4. The system of claim 2, wherein the scoring function comprises, for each language, a scoring model that is trained using written expressions of numbers and spoken words for each written expression.

5. The system of claim 4, wherein the written expressions of numbers are collected from a corpus of documents.

6. The system of claim 4, wherein for each language, the written expressions of numbers are generated from spoken words that are applied as in input to an inversion of the lexical map and the language universal grammar.

7. The system of claim 1, wherein selecting one of the possible verbalizations as a selected verbalization for the input string comprises:
   applying to each possible verbalization of the input string, a grammatical ruleset for the language of the possible verbalization; and
   selecting one of the possible verbalizations as a selected verbalization for the input string based on the selected verbalization satisfying the grammatical ruleset that was applied to it.

8. The system of claim 1, wherein the semiotic class is one of a cardinal number class, a date class, and a currency class.

9. The system of claim 1, wherein the semiotic class is a cardinal number class, and the language universal covering grammar receives as input a first number and generates as output a sequence of two or more second numbers that are a language specific factorization of the first number.

10. The system of claim 9, wherein each lexical map receives as input one or more of the first number and the two or more second numbers that are a language specific factorization of the first number and generates as output possible verbalizations of the input to the lexical map.

11. The system of claim 9, wherein language universal covering grammar and each lexical map are finite state transducers.

12. A non-transitory computer readable storage medium storing instructions executable by a data processing apparatus and that upon such execution causes the data processing apparatus to perform operations comprising:
   receiving an input string;
   accessing, for a semiotic class of non-standard words, a language universal covering grammar for a plurality of languages that generates, for each language of the plurality of languages, one or more sequences of word-level components for each instance of a member of the semiotic class in the language;
   for each of the plurality of languages, accessing a lexical map specific to the language and that maps each sequence of word-level components for each instance of a member of the semiotic class in the language to verbalizations in the language;
   generating, from the language universal grammar and the lexical maps, a lattice of possible verbalizations of the input string; and
   selecting one of the possible verbalizations as a selected verbalization for the input string.

13. A computer implemented method, comprising:
   receiving an input string;
   accessing, by a computer system and for a semiotic class of non-standard words, a language universal covering grammar for a plurality of languages that generates, for each language of the plurality of languages, one or more sequences of word-level components for each instance of a member of the semiotic class in the language;
   for each of the plurality of languages, accessing, by the computer system, a lexical map specific to the language and that maps each sequence of word-level components for each instance of a member of the semiotic class in the language to verbalizations in the language;
   generating, by the computer system and from the language universal grammar and the lexical maps, a lattice of possible verbalizations of the input string; and
   selecting, by the computer system, one of the possible verbalizations as a selected verbalization for the input string.

* * * * *